US009627942B2

(12) United States Patent
Nagaya (10) Patent No.: US 9,627,942 B2
(45) Date of Patent: Apr. 18, 2017

(54) MOUNTING METHOD OF ELECTROMAGNETIC GENERATOR AND TIRE WITH BUILT-IN ELECTROMAGNETIC GENERATOR

(71) Applicant: BRIDGESTONE CORPORATION, Tokyo (JP)

(72) Inventor: Go Nagaya, Tokyo (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 5 days.

(21) Appl. No.: 14/765,394

(22) PCT Filed: Jan. 29, 2014

(86) PCT No.: PCT/JP2014/051978
§ 371 (c)(1),
(2) Date: Aug. 3, 2015

(87) PCT Pub. No.: WO2014/123049
PCT Pub. Date: Aug. 14, 2014

(65) Prior Publication Data
US 2015/0372564 A1 Dec. 24, 2015

(30) Foreign Application Priority Data
Feb. 5, 2013 (JP) ................. 2013-020441

(51) Int. Cl.
*H02K 7/18* (2006.01)
*H02K 15/14* (2006.01)
(Continued)

(52) U.S. Cl.
CPC ........... *H02K 7/1892* (2013.01); *B60C 19/00* (2013.01); *B60C 23/041* (2013.01); *H02K 15/14* (2013.01);
(Continued)

(58) Field of Classification Search
CPC .... H02K 7/1892; H02K 15/14; H02K 7/1876; H02K 35/02; B60C 19/00; B60C 23/041
(Continued)

(56) References Cited

U.S. PATENT DOCUMENTS

| 4,405,872 A | 9/1983 | Thomas |
| 6,774,172 B1 * | 8/2004 | Nakamura ................ B60C 1/00 |
| | | 428/361 |

(Continued)

FOREIGN PATENT DOCUMENTS

| JP | 2005-189706 A | 7/2005 |
| JP | 2005-195915 A | 7/2005 |

(Continued)

OTHER PUBLICATIONS

Translation of Written Opinion dated Aug. 11, 2015 issued by the International Searching Authority in counterpart International application No. PCT/JP2014/051978.
(Continued)

Primary Examiner — Viet Nguyen
(74) Attorney, Agent, or Firm — Sughrue Mion, PLLC (57) ABSTRACT

When an electromagnetic generator 10 having a pendulum structure is mounted on an interior surface of a tire 20, an equivalent pendulum length l of a pendulum 14 is adjusted such that an integral multiple of a period λ of the pendulum 14, which is determined by the equivalent pendulum length l of the electromagnetic generator 10, is not in agreement with both of an integral multiple of a circumferential length L of the tire 20 and a length S of a non-grounded part of the tire, which is obtained by subtracting a ground contact length C from the circumferential length L of the tire 20, whereby the power generation capacity of the electromagnetic generator mounted on the tire can be improved regardless of the type of the tire.

3 Claims, 7 Drawing Sheets (51) Int. Cl.
*B60C 19/00* (2006.01)
*H02K 35/02* (2006.01)
*B60C 23/04* (2006.01)

(52) U.S. Cl.
CPC ........ *H02K 35/02* (2013.01); *B60C 2019/005* (2013.04); *H02K 2213/03* (2013.01); *Y10T 29/49011* (2015.01)

(58) Field of Classification Search
USPC ....................................................... 290/1 R
See application file for complete search history.

(56) References Cited

U.S. PATENT DOCUMENTS

| | | | | |
|---|---|---|---|---|
| 2003/0005757 A1* | 1/2003 | Koeune | ................... | B60C 5/142 73/146 |
| 2007/0152511 A1* | 7/2007 | Sakai | ................... | B60C 23/041 310/10 |
| 2008/0093955 A1* | 4/2008 | Lunde | ................... | H02K 7/1846 310/67 A |
| 2011/0084497 A1* | 4/2011 | Barbar | ................ | H02K 7/1876 290/1 A |
| 2012/0152426 A1* | 6/2012 | Maehara | ............. | B60C 17/0009 152/517 |
| 2013/0229089 A1* | 9/2013 | Sepp | ........................ | H02N 2/18 310/339 |
| 2015/0360515 A1* | 12/2015 | Watanabe | ................. | B60C 3/04 152/454 |

FOREIGN PATENT DOCUMENTS

JP  2011-229309 A  11/2011
JP  2011-239510 A  11/2011

OTHER PUBLICATIONS

International Search Report for PCT/JP2014/051978 dated Apr. 22, 2014.
Communication dated Dec. 1, 2016 from the European Patent Office in counterpart application No. 14748783.9.

* cited by examiner

MOUNTING METHOD OF ELECTROMAGNETIC GENERATOR AND TIRE WITH BUILT-IN ELECTROMAGNETIC GENERATOR

CROSS REFERENCE TO RELATED APPLICATIONS

This application is a National Stage of International Application No. PCT/JP2014/51978 filed Jan. 29, 2014, claiming priority based on Japanese Patent Application No. 2013-020441 filed Feb. 5, 2013, the contents of all of which are incorporated herein by reference in their entirety.

TECHNICAL FIELD

The present invention relates to a mounting method of the electromagnetic generator to be mounted on an inner surface of a tire, and a tire having the electromagnetic generator mounted therein.

BACKGROUND ART

An electromagnetic generator having a pendulum structure has conventionally been known as an intra-tire power generating unit to be mounted on an inner surface of a tire (see Patent Document 1, for instance).

The electromagnetic generator is of such design that a permanent magnet swings like a pendulum relative to a coil inside a tire when the tire is rolling. In particular, high voltage is generated at both ends of the coil at the ground contact start point (leading point) and the ground contact end point (trailing point) where the pendulum is accelerated precipitously by the fore-aft acceleration occurring in the circumferential direction of the tire interior.

With an electromagnetic generator of the foregoing arrangement, shortening the equivalent pendulum length has been a way employed to reduce the inertia of the pendulum portion to improve power generation capacity.

RELATED ART DOCUMENT

Patent Document

Patent Document 1: Japanese Unexamined Patent Application Publication No. 2011-239510

SUMMARY OF THE INVENTION

Problems to be Solved by the Invention

However, with the conventional electromagnetic generator, the tire size has not been taken into consideration when setting the equivalent pendulum length. As a result, there have been cases of decline in power generation capacity depending on how the equivalent pendulum length and the moving radius of the tire are in combination with each other.

The present invention has been made in view of these conventional problems, and an object thereof is to provide a mounting method of the electromagnetic generator capable of improving the power generation capacity regardless of the type of tire and a tire having the electromagnetic generator mounted therein.

Means for Solving the Problem

The present invention provides a mounting method of an electromagnetic generator of a pendulum structure on an inner surface of a tire. The method includes adjusting an equivalent pendulum length such that an integral multiple of a natural wavelength $\lambda$ of a pendulum determined by the equivalent pendulum length of the electromagnetic generator is not in agreement with both of an integral multiple of a circumferential length of the tire and a length of non-grounded part of the tire, which is obtained by subtracting a ground contact length from the circumferential length of the tire, and mounting the electromagnetic generator with the adjusted equivalent pendulum length on the inner surface of the tire.

It is to be noted that the length of non-grounded part of the tire as used herein is the length of non-grounded part of the tire when the tire fitted on a standard rim is under normal internal pressure and normal load.

Also, the equivalent pendulum length 1 can be expressed as $1 = I/(M \cdot d)$ where M is a mass of a rigid body constituting the pendulum, d is a distance between the rotating shaft and the center of gravity of the pendulum, and I is an inertia moment about the rotating shaft of the pendulum.

It is to be understood that the foregoing summary of the invention does not necessarily recite all the features essential to the invention, and subcombinations of all these features are intended to be included in the invention.

MODE FOR CARRYING OUT THE INVENTION

Figure 1A:
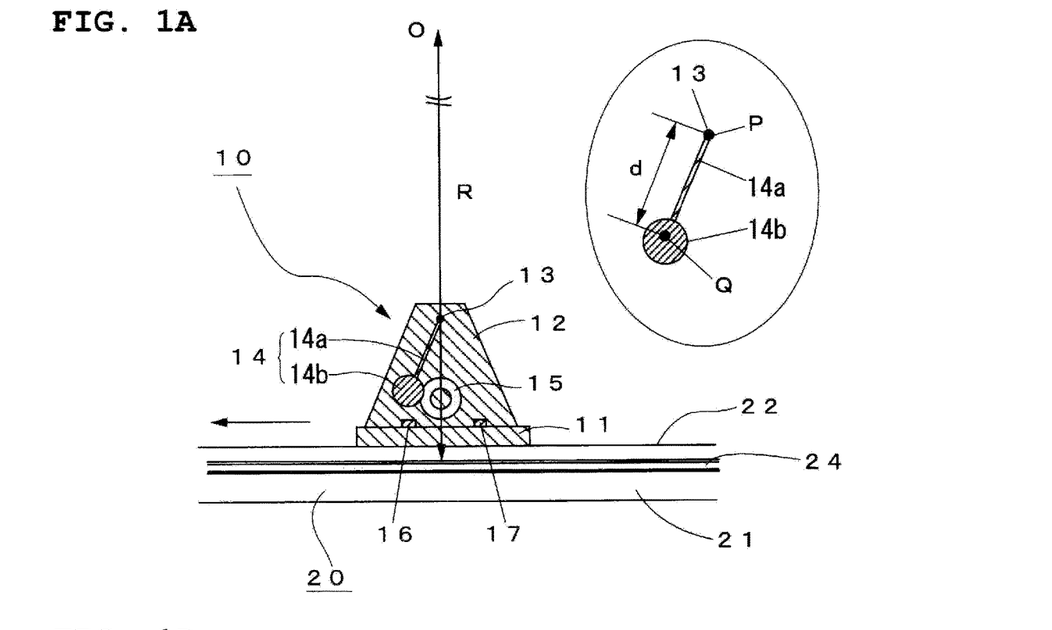
FIGS. 1A and 1B are schematic illustrations showing a pendulum-type electromagnetic generator according to an embodiment of the present invention.
Figure 1B:
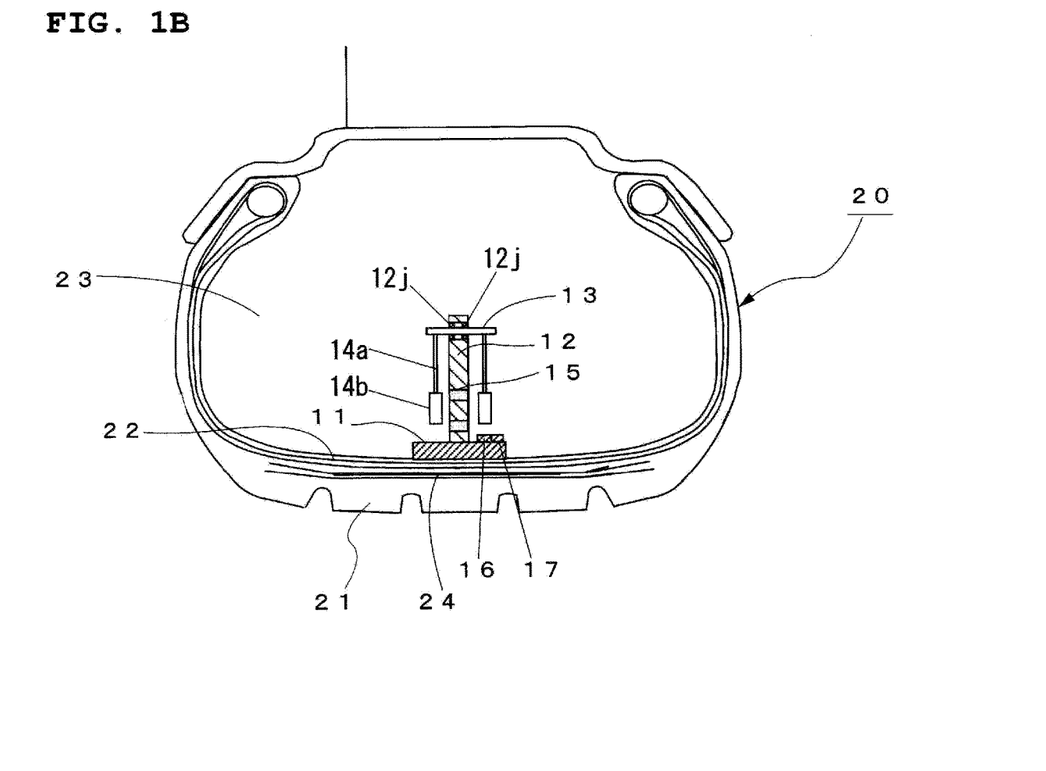

FIGS. 1A and 1B are schematic illustrations showing a pendulum-type electromagnetic generator (hereinafter referred to as a generator) 10 according to an embodiment of the present invention. FIG. 1A is a cross-sectional view taken along a plane perpendicular to the axial direction of a tire, and FIG. 1B is a cross-sectional view taken along a plane perpendicular to the radial direction of the tire.

The generator 10 includes a plate-like base 11 to be installed within a tire 20, a rotation support member 12 standing upright in the center of the base 11, a rotating shaft 13, the middle part of which is rotatably attached to the rotation support member 12 on the side opposite from the base 11 via bearings 12j, a pair of pendulums 14, each of which has a support rod 14a with one end thereof fixed to an end portion of the rotating shaft 13 and a disk-shaped permanent magnet 14b attached to the other end of the support rod 13, a disk-shaped coil 15 fitted in the base 11 side of the rotation support member 12, a rectifier circuit 16 connected to both ends of the coil 15, and a condenser 17 for storing electric charge generated by the coil 15.

The generator 10 is installed nearly in the center of the tire air chamber 23 side of an inner liner 22 on the back side of a tread 21 such that the extension direction of the rotating shaft 13 is in parallel with the direction of the axis of tire rotation. And the generator 10 rotates along with the rotation of the tire 20.

The disk-shaped permanent magnet 14b is equivalent to the bob of a pendulum.

A pair of permanent magnets 14b, 14b are magnetized such that the polarity of the opposing surfaces is different from each other. On the other hand, the coil 15 is formed by winding a coated conductor wire around an axis parallel to the extension direction of the rotating shaft 13. And the coil 15 is fixed in a position such that the center thereof is nearly in alignment with the center of the permanent magnet 14b when the permanent magnet 14b, which is the bob of the pendulum 14, is located at the lowest position (outer side of the tire radial direction).

The rectifier circuit 16 and the condenser 17 are located in a space on the base 11 clear of such parts as the rotation support member 12 and the pendulums 14.

Figure 2A:
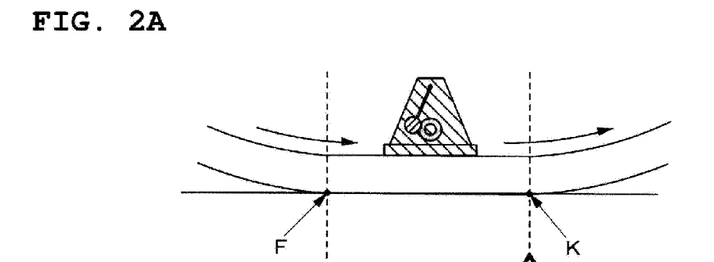
FIGS. 2A and 2B are diagrams showing a shape of a tire when it is rolling and a waveform of circumferential acceleration.
Figure 2B:
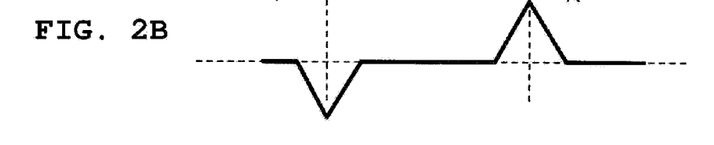

As the tire 20 rolls while in contact with the ground, the pendulums 14 of the generator 10 develop circumferential acceleration as shown in FIG. 2B at the ground contact start point F called the step-in point and the ground contact endpoint K called the kick-out point as shown in FIG. 2A. Hence, the pendulums 14 are accelerated in pendular motion around the rotating shaft 13. As a result, changes in the magnetic flux density penetrating the coil 15 generate voltage (induced electromotive force) at the both ends of the coil 15. This induced electromotive force is rectified by a rectifier and a smoothing capacitor, which constitute the rectifier circuit 16, and stored in the condenser 17.

Figure 3:
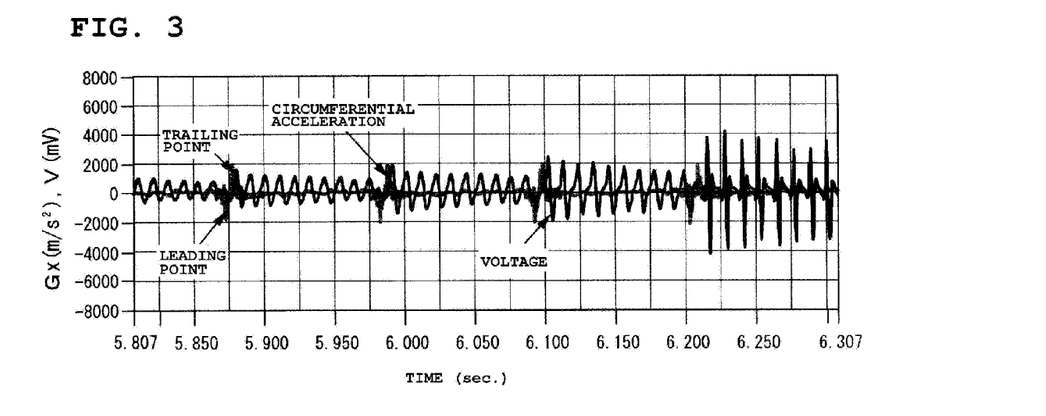
FIG. 3 is a diagram for explaining the states of acceleration of a pendulum.

FIG. 3 is a diagram showing changes in circumferential acceleration and voltage (generated voltage) at both ends of the coil 15 with time. The pendulums 14 gain their motion velocity under the influence of circumferential acceleration at the step-in time and the kick-out time, thereby raising the generated voltage. That is, on the left-hand side of FIG. 3, the amplitude of the pendulums 14 is small and the generated voltage is low because the pendulums 14 are not sufficiently accelerated. However, the pendulums 14 get accelerated under the influence of circumferential acceleration with every revolution of the tire. Thus, the amplitude of the pendulums 14 becomes larger gradually, and on the right-hand side of FIG. 3, the pendulums 14 make a transition from pendular motion to high-speed rotary motion with a result of raising the generated voltage.

The period T of pendular motion of the pendulums 14 can be expressed as $T=2\pi(l/G)^{1/2}$ where l is the equivalent pendulum length of the pendulums 14 and G is the gravitational acceleration.

Where the mass $m_a$ of the support rod 14a can be ignored in comparison with the mass $m_b$ of the permanent magnet 14b, which is the bob, the equivalent pendulum length l of the pendulum 14 is nearly equal to the distance between the rotating shaft 13 and the center of the permanent magnet 14b. Generally, however, $l=I/(M \cdot d)$ where I is the inertia moment about the rotating shaft 13 of the pendulums 14, M ($M=m_a+m_b$) is the mass of the pendulums 14, and d is the distance between the gravity center P of the pendulums 14 and the center Q of the rotating shaft 13.

Also, the pendulum wavelength λ, which is the distance of the tire rolling during a single period of oscillation of the pendulums 14, is λ=VT (V being the rotation speed of the tire).

Also, since the generator 10 is mounted on the inner surface of the tire with moving radius R, the gravitational acceleration G varies with the rotation speed V of the tire and can be expressed as $G=(V/R^2)^{1/2}$. It is to be noted that the moving radius R of the tire, which is the radius of the tire when it is rolling, is approximated herein by the distance between the center O of the rotation axis of the tire and the belt layer 24 as shown in FIG. 1A.

Thus, when the generator 10 having the pendulums 14 of equivalent pendulum length l is installed within the tire 20 of moving radius R and the vehicle is operated at rotation speed V of the tire, the pendulum wavelength is $\lambda=2\pi(R \cdot l)^{1/2}$.

Figure 4:
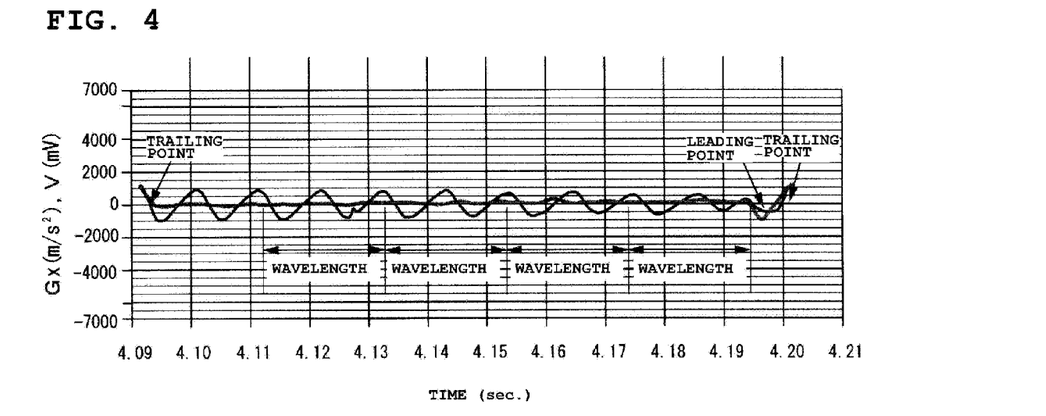
FIG. 4 is a diagram showing a relationship between circumferential acceleration waveform and generated voltage (for one revolution of a tire).

That is, as shown in FIG. 4, the pendulums 14 swings in pendular motion of natural wavelength λ, which is determined by the moving radius R and the equivalent pendulum length l, irrespective of the rotation speed V of the tire.

On the other hand, the circumferential length L for a single tire revolution is L=2πR where R is the moving radius of the tire 20 having the generator 10 mounted therein.

At this time, if an integral multiple of the natural wavelength λ of the generator 10 becomes equal to an integral multiple of the circumferential length L as in n·λ=m·L (n and m being positive integers), the phase of the pendular motion of the generator 10 is fixed in relation to the distance for m revolutions of the tire 20. Then since the pendular motion of the generator 10 behaves like a standing wave, the position and the number of times of receiving the circumferential acceleration occurring at the leading time and the trailing time are fixed.

In the present arrangement, there exists an optimum position where high voltage is generated by the acceleration of the pendulums 14. This optimum position is a little (about 0.03 mm here) ahead of the position where the leading position falls in with the lowest position of the pendulums 14 as indicated by the thick broken lines in FIGS. 5A and 5B.

Figure 5A:
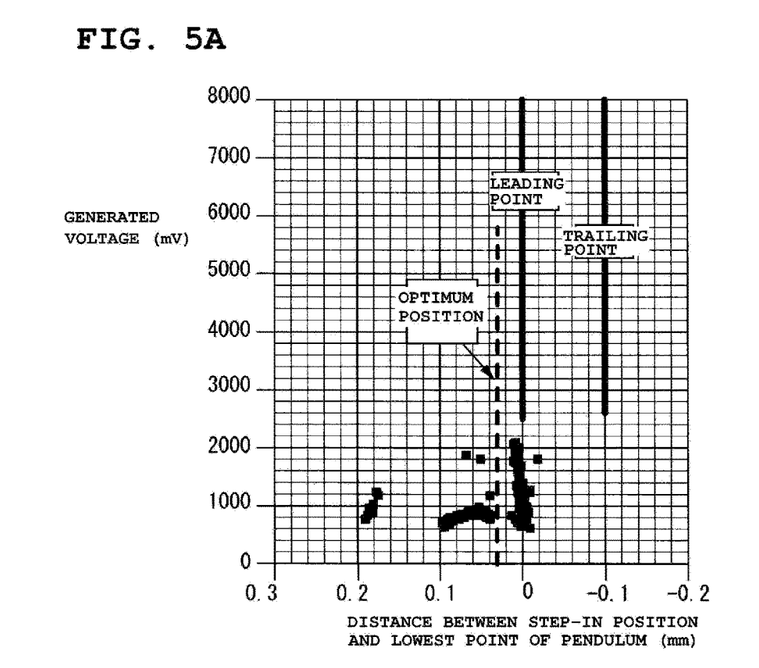
FIGS. 5A and 5B are diagrams showing relationships between the lowest point of the pendulum, the step-in position, and the generated voltage.
Figure 5B:
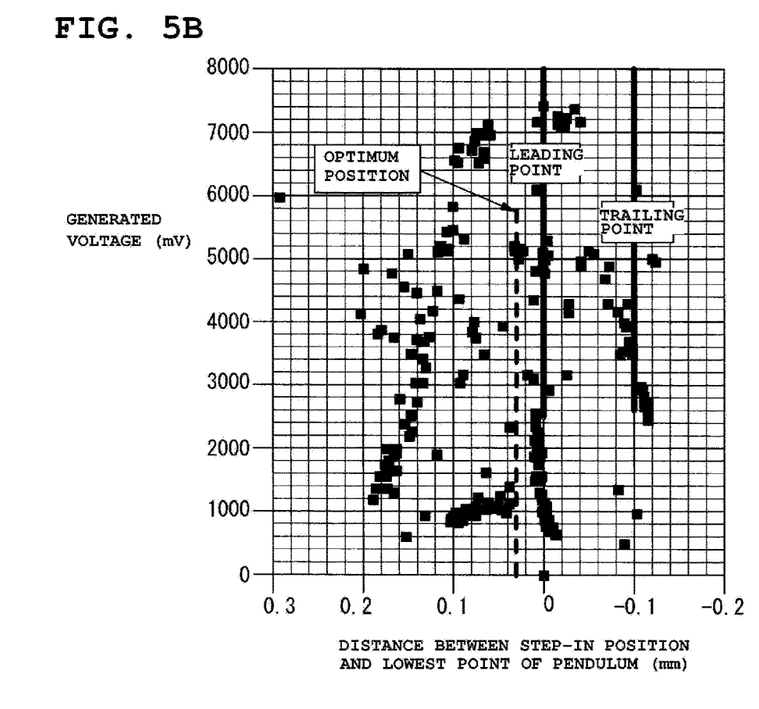

When the lowest position of the pendulums 14 passes the optimum position, the pendulums 14 are subjected to a maximum circumferential acceleration. Hence, the greater the number of times the lowest position of the pendulums 14 passes the optimum position, the faster the pendulums 14 will rotate by being accelerated intermittently, and the higher the voltage generated across the coil 15 will be.

FIG. 5A is a diagram showing a relationship between the lowest point of the pendulum, the step-in position, and the generated voltage when an integral multiple of the natural wavelength λ of the generator 10 is in agreement with an integral multiple of the circumferential length L. If the phase of pendular motion is fixed, the lowest point of the pendulum immediately before the step-in time does not coincide with the optimum position. As a result, the pendulums 14 cannot be accelerated, and the generated voltage becomes low. That is, the pendulums 14 cannot be accelerated effectively by the circumferential acceleration, resulting in lower generated voltage.

In contrast to this, the phase of pendular motion is not fixed if an integral multiple of the natural wavelength λ of the generator 10 is not in agreement with an integral multiple of the circumferential length L, that is, if the moving radius R of the tire 20 and the equivalent pendulum length l are in a relationship of $(R \cdot l)^{1/2} = p \cdot R$ (p being a positive non-integer). As a result, as shown in FIG. 5B, the phase of pendular motion shifts little by little in relation to the tire 20 with every revolution of the tire 20. Thus the pendulums 14 can pass the optimum position, where they can be greatly accelerated, numerous times. Therefore, the pendulums 14 rotate at high speed by being accelerated intermittently and thus can generate high voltage across the coil 15.

Figure 6:
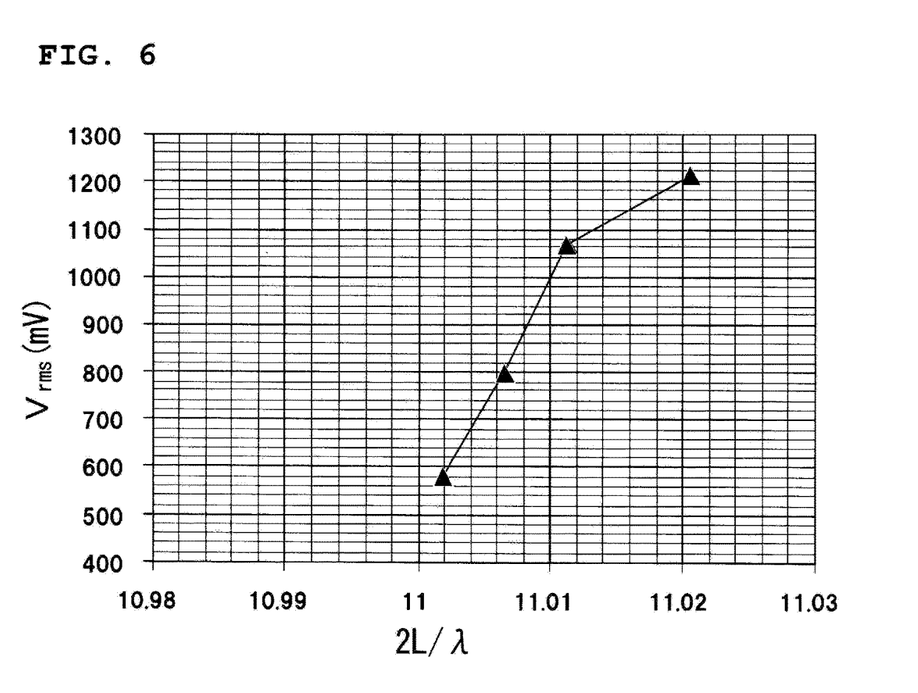
FIG. 6 is a diagram showing a relationship between 2 circumferential length/wavelength ratio and average voltage value.

FIG. 6 is a diagram showing a relationship between 2 times the tire circumference length L, the natural wavelength λ, and the generated voltage. The horizontal axis represents the ratio of 2 times the tire circumference length to the wavelength (2L/λ), and the vertical axis the average value of generated voltage. As is clear from FIG. 6, the average value of generated voltage lowers as 11 times the natural wavelength λ of the generator 10 gets closer to 2 times the tire circumferential length L, and increases as 11 times the natural wavelength λ of the generator 10 gets farther from 2 times the tire circumferential length L.

Thus, the combination of the tire 20 and the generator 10 should be so designed that there is no agreement between an integral multiple of the tire circumference length L and an integral multiple of the natural wavelength λ of the equivalent pendulum. Then it is not only possible to prevent drops in generated voltage on account of the pendular motion becoming a standing wave, but also to accelerate the pendulums 14 effectively because the pendulums 14 can pass the optimum position, where they can be greatly accelerated, numerous times. Accordingly, the generated voltage can be raised by the high-speed rotary motion of the pendulums 14, which assures stable supply of power to a sensor, a device, or even a wireless device installed within the tire.

As an adjustment to ensure that there is no agreement between an integral multiple of the natural wavelength λ of the equivalent pendulum length 1 and an integral multiple of the tire circumference length L, it may suffice to change the equivalent pendulum length 1 by about 10%. Also, it is known that a longer equivalent pendulum length 1 stabilizes the generated voltage.

For example, with the pendulums 14, which are each constituted by a permanent magnet 14b attached to the tip of a support rod 14a, it is simpler to have the length of the support rod 14a adjustable. In such a case, however, the position of the coil 15 may have to be lowered. It is preferable therefore that the equivalent pendulum length 1 is made longer by removably attaching a weight to the permanent magnet 14b on the side opposite from the support rod 14a.

In this manner, if the equivalent pendulum length 1 is made adjustable, the power generation capacity of the generator 10 can be improved irrespective of the type of the tire 20 on which it is installed.

Also, when the pendulums 14 are rigid-body pendulums, the use of a structure in which a weight is removably attached to the rigid body on the side opposite from the rotating shaft can adjust the equivalent pendulum length 1 without moving the position of the coil 15.

Or it is possible to prepare a plurality of pendulum bodies each having a permanent magnet attached thereto on the side opposite from the rotating shaft 13 and having the inertia moment I about the rotating shaft varying from each other. And the pendulum body can be changed for each different tire 20 on which the generator 10 is to be mounted.

The phase of the pendular motion gets fixed also when an integral multiple of the natural wavelength λ of the generator 10 coincides with the non-grounded length S.

Figure 7A:
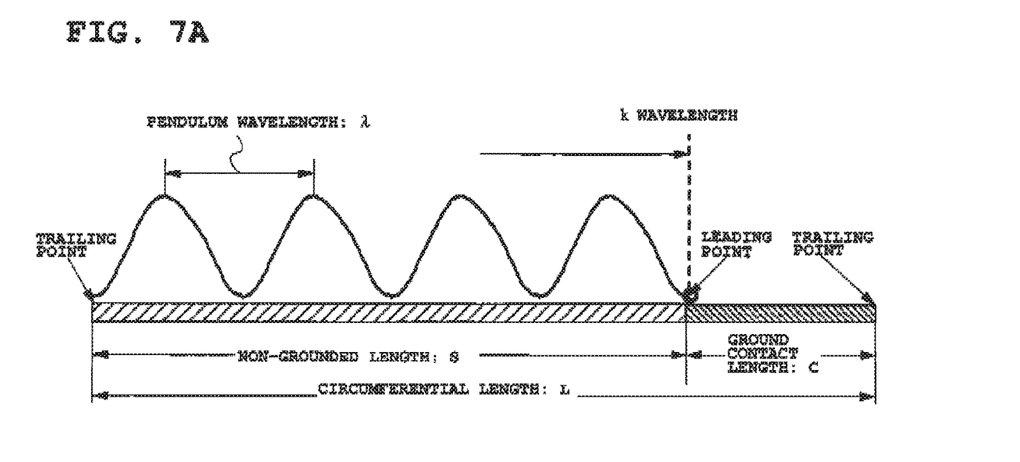
FIGS. 7A and 7B are diagrams showing a relationship between the pendulum position and generated voltage when the non-grounded length and an integral multiple of the pendulum wavelength are in agreement with each other.

As shown in FIG. 7A, the non-grounded length S, which is the length of the part of the tire 20 not grounded, is S=L−C where L is the circumferential length of the tire 20 and C the ground contact length, or the distance from the step-in point to the kick-out point. Here, if an integral multiple of the natural wavelength λ of the generator 10 and the non-grounded length S are in agreement with each other as in k·λ=S (k being a positive integer), then the phase of the pendular motion of the generator 10 is fixed in relation to the circumferential length of the tire 20 and the pendular motion of the generator 10 behaves like a standing wave. Therefore, in the same way as when an integral multiple of the natural wavelength λ of the generator 10 and an integral multiple of the circumferential length L are in agreement with each other, the generated voltage becomes low because the pendulums 14 cannot be accelerated effectively by the circumferential acceleration occurring at the step-in point and the kick-out pint.

Figure 7B:
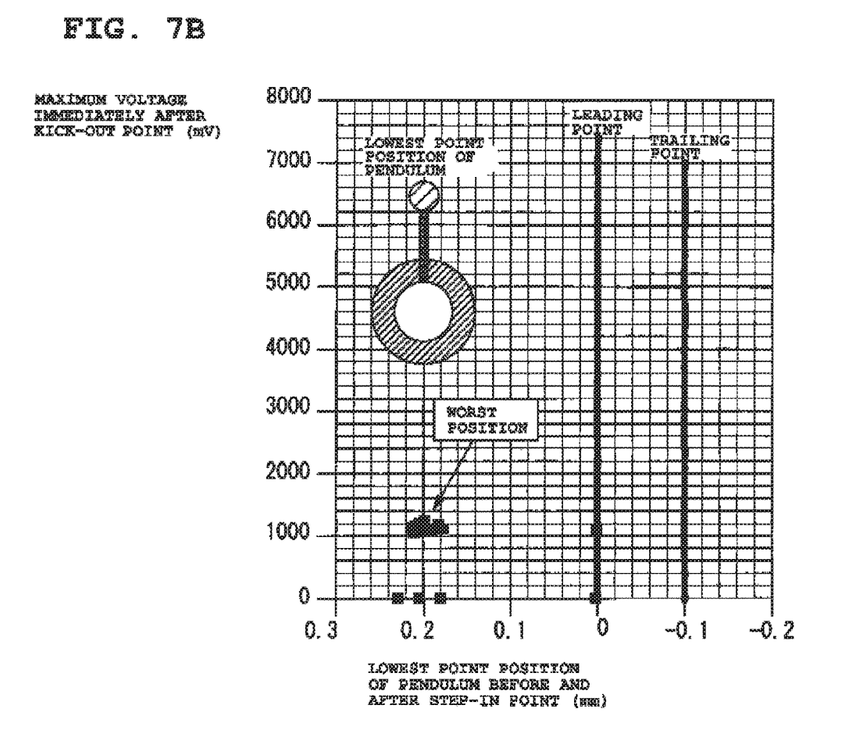

FIG. 7B is a diagram showing a relationship between the lowest point of the pendulums 14, the step-in position, and the generated voltage when an integral multiple of the natural wavelength λ of the generator 10 and the non-grounded length S are in agreement with each other. If the phase of the pendular motion is fixed, the condition in which the lowest point of the pendulum immediately before the step-in time (the lowest point being in the worst position in the figure) continues on and on. Therefore, the pendulums 14 cannot be accelerated, thus resulting in lowered voltage generated. That is, such a condition does not allow effective acceleration of the pendulums 14 by the circumferential acceleration, and hence the generated voltage becomes low.

Figure 8A:
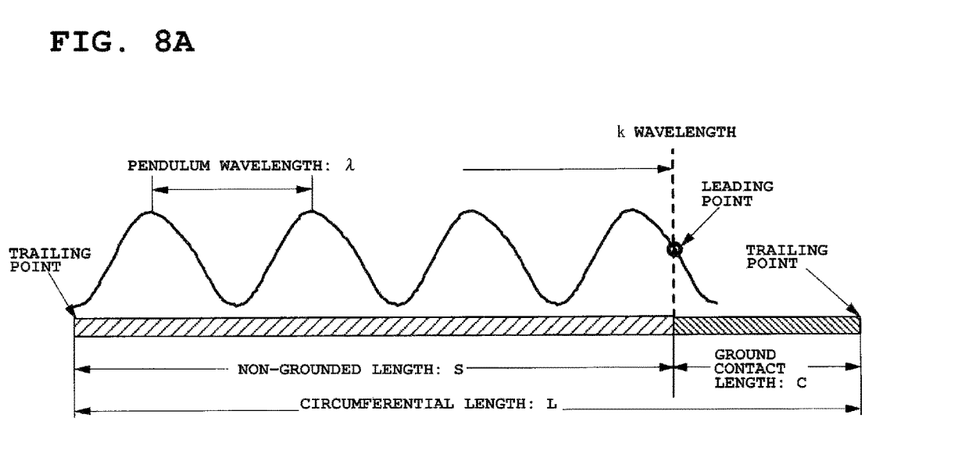
FIGS. 8A and 8B are diagrams showing a relationship between the pendulum position and generated voltage when the non-grounded length and the integral multiple of the pendulum wavelength are not in agreement with each other.
Figure 8B:
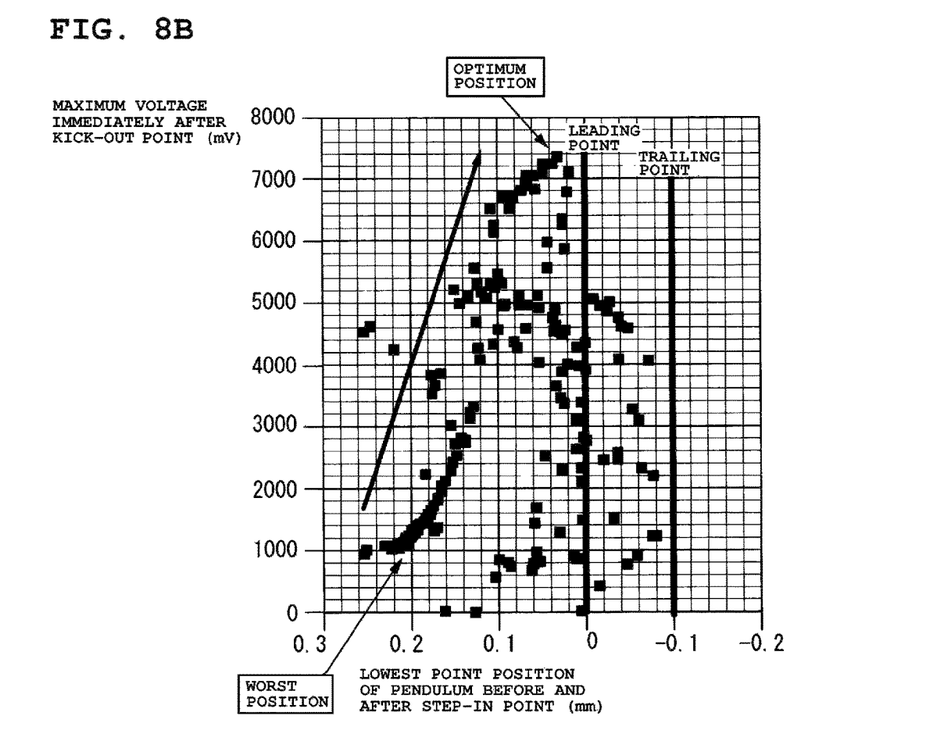

On the other hand, as shown in FIG. 8A, when an integral multiple of the natural wavelength λ of the generator 10 and the non-grounded length S are not in agreement with each other, that is, when the equivalent pendulum length l, the moving radius R, and the non-grounded length S are in a relationship of $2\pi q \cdot (R \cdot l)^{1/2} = S$ (q: a positive non-integer), the phase of the pendular motion is not fixed. Therefore, as shown in FIG. 8B, the phase of the pendular motion shifts little by little in relation to the tire 20 with every revolution of the tire 20. Accordingly, the pendulums 14 can pass the optimum position, where they can be greatly accelerated, numerous times. And the pendulums 14 rotate at high speed by being accelerated intermittently, thus generating high voltage.

Figure 9:
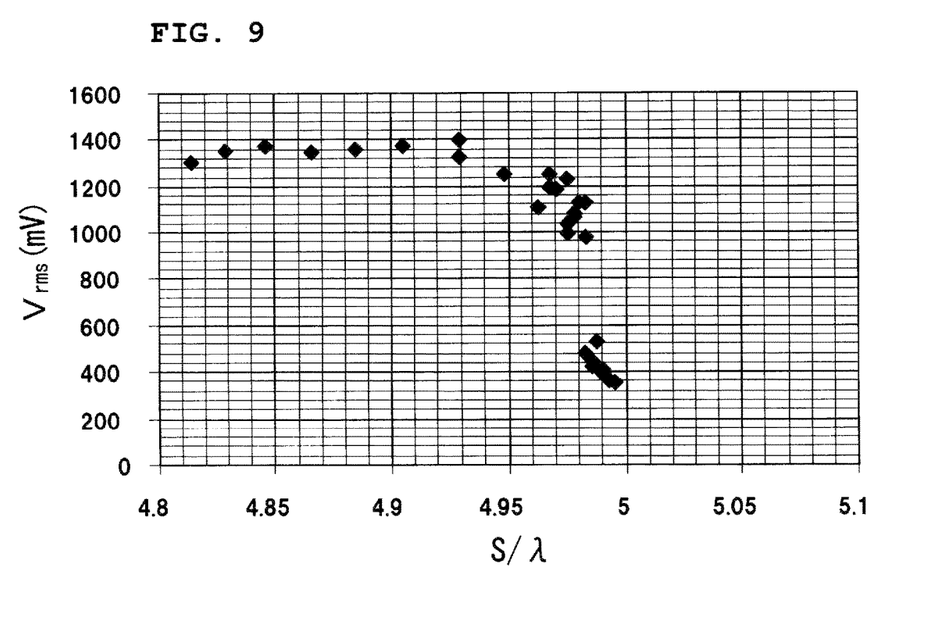
FIG. 9 is a diagram showing a relationship between non-grounded length/wavelength ratio and average voltage value.

FIG. 9 is a diagram showing a relationship between the non-grounded length S, the natural wavelength λ, and the generated voltage. The horizontal axis represents the ratio of the non-grounded length to the wavelength (S/λ), and the vertical axis the average value of generated voltage. As is clear from FIG. 9, the average value of generated voltage lowers as 5 times the natural wavelength λ of the generator 10 gets closer to the non-grounded length S, and increases as 5 times the natural wavelength λ of the generator 10 gets farther from the non-grounded length S.

Thus, the combination of the tire 20 and the generator 10 should be so designed that there is no agreement between an integral multiple of the natural wavelength λ of the generator 10 and the non-grounded length S. Then it is possible to prevent the pendular motion from turning into a standing wave relative to a single revolution of the tire. This allows effective acceleration of the generator, thereby further improving the power generation capacity of the generator.

In the foregoing, the invention has been described with reference to specific embodiments thereof. However, the technical scope of this invention is not to be considered as limited to those embodiments. It will be evident to those skilled in the art that various modifications and changes may be made thereto without departing from the broader spirit and scope of the invention. It will also be evident from the scope of the appended claims that all such modifications are intended to be included within the technical scope of this invention.

Figure 10:
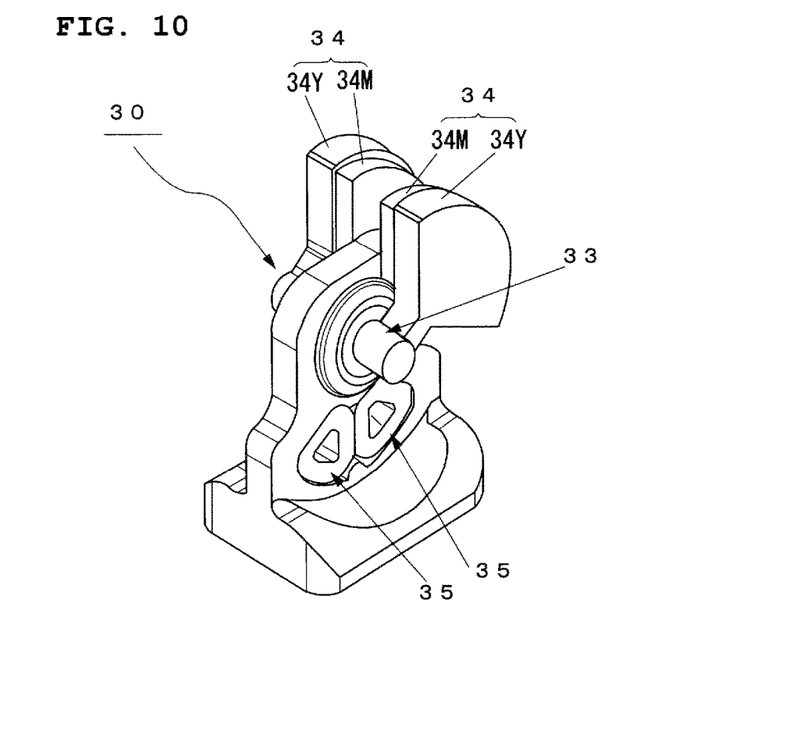
FIG. 10 is an illustration showing another example of a pendulum-type electromagnetic generator.

In the preferred embodiments thus far described, the generator 10 is an electromagnetic generator having the pendulums 14 each consisting of a support rod 14a and a disk-shaped permanent magnet 14b, but the generator 10 is not limited to this form. For example, as shown in FIG. 10, the generator 30 may be of such form that the pendulums 34, each equipped with a fan-shaped permanent magnet 34M and yoke 34Y, are attached to the rotating shaft 33. Also, the coil may be in a form of two ring-shaped coils 35, 35. And it goes without saying that the inertia moment I' and the mass M' of the pendulums 35 are the inertia moment and the mass of the combination of the permanent magnets 34M and the yokes 34Y.

EXAMPLES

Generators having different equivalent pendulum lengths l were mounted on tires whose moving radius R was 0.337 m and circumferential length L was 2.13 m. And vehicles fitted with these tires were operated at various speeds. Table 1 shows the results of comparison of power generation capacity of these generators.

In Comparative Example 1, the equivalent pendulum length l was set such that the 2 circumferential length/wavelength ratio $(2L/\lambda)$ was an integer and the non-grounded length/wavelength ratio $(S/\lambda)$ was a non-integer.

In Comparative Example 2, the equivalent pendulum length l was set shorter than that of Example 1, but the 2 circumferential length/wavelength ratio $(2L/\lambda)$ was an integer and the non-grounded length/wavelength ratio $(S/\lambda)$ was a non-integer in the same way as in Example 1.

In Comparative Example 3, the equivalent pendulum length l was set such that the 2 circumferential length/wavelength ratio $(2L/\lambda)$ was a non-integer and the non-grounded length/wavelength ratio $(S/\lambda)$ was an integer.

In Comparative Example 4, the equivalent pendulum length l was set such that the 2 circumferential length/wavelength ratio $(2L/\lambda)$ and the non-grounded length/wavelength ratio $(S/\lambda)$ were both non-integers when the vehicle was normally loaded and that the non-grounded length/wavelength ratio $(S/\lambda)$ became an integer when the load was reduced.

In Example 1, the equivalent pendulum length l was set such that the 2 circumferential length/wavelength ratio $(2L/\lambda)$ and the non-grounded length/wavelength ratio $(S/\lambda)$ were both non-integers whether the load was normal or reduced.

In Example 2, the equivalent pendulum length l was set longer than that of Example 1, but the 2 circumferential length/wavelength ratio $(2L/\lambda)$ and the non-grounded length/wavelength ratio $(S/\lambda)$ were both non-integers.

TABLE 1

| | Moving radius R(m) | Equivalent pendulum length l(m) | Pendulum wavelength $\lambda$ (m) | Circumferential length L(m) | $2L/\lambda$ | Non-grounded length S(m) | $S/\lambda$ | Decision |
|---|---|---|---|---|---|---|---|---|
| Comparative Example 1 | 0.337 | 0.0136 | 0.426 | 2.13 | 10.0 | 2.04 | 4.8 | X |
| Comparative Example 2 | 0.337 | 0.0113 | 0.388 | 2.13 | 11.0 | 2.04 | 5.3 | X |
| Comparative Example 3 | 0.337 | 0.0125 | 0.408 | 2.13 | 10.4 | 2.04 | 5.0 | X |
| Comparative Example 4 | 0.337 | 0.0130 | 0.416 | 2.13 | 10.2 | 2.04 | 4.9 | X |
| | 0.337 | 0.0130 | 0.416 | 2.13 | 10.2 | 2.06 | 5.0 | |
| Example 1 | 0.337 | 0.0140 | 0.432 | 2.13 | 9.9 | 2.04 | 4.7 | ○ |
| | 0.337 | 0.0140 | 0.432 | 2.13 | 9.9 | 2.06 | 4.8 | |
| Example 2 | 0.337 | 0.0150 | 0.447 | 2.13 | 9.5 | 2.04 | 4.6 | ○ |

It is found from the results that when the 2 circumferential length/wavelength ratio $(2L/\lambda)$ is an integer as in Comparative Examples 1 and 2, the phase of the pendulum is fixed in relation to the tire and hence the power generation performance drops even when the non-grounded length/wavelength ratio $(S/\lambda)$ is a non-integer.

It is also found that as in Comparative Example 3, even when the 2 circumferential length/wavelength ratio $(2L/\lambda)$ is a non-integer, the phase of the pendulum is fixed in relation to the tire and hence the power generation performance drops if the non-grounded length/wavelength ratio $(S/\lambda)$ is an integer.

Also, it is found that as in Comparative Example 4, even when the 2 circumferential length/wavelength ratio $(2L/\lambda)$ and the non-grounded length/wavelength ratio $(S/\lambda)$ are both non-integers, the power generation performance drops if the non-grounded length wavelength ratio $(S/\lambda)$ becomes an integer for a reduction in load.

Thus, it is confirmed that to get high voltage, it is necessary to set the equivalent pendulum length l such that, as in Example 1, the 2 circumferential length/wavelength ratio $(2L/\lambda)$ and the non-grounded length/wavelength ratio $(S/\lambda)$ are both non-integers whether the load is normal or reduced.

Also, as in Example 2, variation in power generation performance relative to traveling modes can be reduced if the equivalent pendulum length l is set slightly longer.

INDUSTRIAL APPLICABILITY

As described thus far, the present invention can improve the power generation performance of the electromagnetic generator irrespective of the type of the tire on which it is mounted. This can realize a cost reduction by reducing the number of generators to be mounted on the tire. Also, it will enhance the output of devices, such as wireless devices, using the electric power.

DESCRIPTION OF REFERENCE NUMERALS 10 pendulum-type electromagnetic generator
11 base
12 rotation support member
12j bearing
13 rotating shaft
14 pendulum
14a support rod
14b permanent magnet
15 coil
16 rectifier circuit
17 condenser
20 tire
21 tread
22 inner liner
23 tire air chamber
24 belt layer

The invention claimed is:

1. A mounting method of an electromagnetic generator having a pendulum structure on an inner surface of a tire, the method comprising:

adjusting an equivalent pendulum length of the electromagnetic generator such that an integral multiple of a natural wavelength λ of a pendulum determined by the equivalent pendulum length is not in agreement with both of an integral multiple of a circumferential length of the tire and a length of non-grounded part of the tire, which is obtained by subtracting a ground contact length from the circumferential length of the tire, and mounting the electromagnetic generator with the adjusted equivalent pendulum length on the inner surface of the tire.

2. A tire, comprising:

an electromagnetic generator of a pendulum structure mounted on an inner surface of the tire, wherein the electromagnetic generator has a pendulum structure comprising a base, a rotating body at least partially configured by a magnet, the rotating body being mounted on the base and rotating in such a manner that a rotating center of the rotating body does not coincide with a center of gravity of the pendulum structure, and a coil fixed to the base in such a manner that the coil crosses a magnetic field of the magnet, and wherein an equivalent pendulum length l of the rotating body and a moving radius R of the tire are in a relationship of $(R \cdot l)^{1/2} = p \cdot R$ (wherein p is a positive non-integer).

3. The tire according to claim 2, wherein when S is a length of a non-grounded part of the tire, the equivalent pendulum length l, the moving radius R, and the non-grounded part length S are in a relationship of $2\pi q \cdot (R \cdot l)^{1/2} = S$ (wherein q is a positive non-integer).

* * * * *